United States Patent
Ding et al.

(10) Patent No.: US 12,156,181 B2
(45) Date of Patent: Nov. 26, 2024

(54) METHOD AND DEVICE FOR RESOURCE SELECTION IN VEHICLE NETWORKING SYSTEM, TERMINAL AND MEDIUM

(71) Applicant: GUANGDONG OPPO MOBILE TELECOMMUNICATIONS CORP., LTD., Dongguan (CN)

(72) Inventors: Yi Ding, Dongguan (CN); Zhenshan Zhao, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 358 days.

(21) Appl. No.: 17/678,531

(22) Filed: Feb. 23, 2022

(65) Prior Publication Data
US 2022/0191837 A1    Jun. 16, 2022

Related U.S. Application Data

(63) Continuation of application No. PCT/CN2020/070338, filed on Jan. 3, 2020.

(51) Int. Cl.
*H04W 72/04* (2023.01)
*H04L 1/1812* (2023.01)
*H04W 4/40* (2018.01)

(52) U.S. Cl.
CPC ........... *H04W 72/04* (2013.01); *H04L 1/1812* (2013.01); *H04W 4/40* (2018.02)

(58) Field of Classification Search
CPC .............................. H04W 4/40; H04L 1/1812
(Continued)

(56) References Cited

U.S. PATENT DOCUMENTS

2021/0212117 A1    7/2021  Chae et al.
2022/0377733 A1*  11/2022  Ko ..................... H04L 5/0078

FOREIGN PATENT DOCUMENTS

CN    107995659 A    5/2018
CN    108024230 A    5/2018
(Continued)

OTHER PUBLICATIONS

Notice of Allowance issued in corresponding Chinese Application No. 202210290260.1, mailed Aug. 11, 2023.
(Continued)

*Primary Examiner* — Dang T Ton
(74) *Attorney, Agent, or Firm* — BAYES PLLC

(57) ABSTRACT

The present application discloses a method and a device for resource selection in a vehicle networking system, a terminal and a medium, relating to the field of wireless communication, wherein the method comprises the following steps: when there is a service to be transmitted at time n, select an initial transmission resource of the service in a resource selection window, the initial transmission resource is located between time n and time n+p; wherein, the resource selection window is a window from time $n+T_{11}$ to time $n+T_{12}$, a first time period from time n to time $T_{11}$ is greater than or equal to a processing delay of a sending terminal, a second time period from time n to time $T_{12}$ is equal to or less than a required delay range of the service, and the value of p is less than a preset value W. In the present application, when the terminal performs resource selection in the resource selection window, by selecting the initial transmission resource of the service between time n and time n+p, it avoids the initial transmission service of the resource through a lower time domain position in the resource selection window, and reduces the delay of service transmission.

13 Claims, 7 Drawing Sheets

(58) Field of Classification Search
USPC .................................. 370/329, 401, 405
See application file for complete search history.

(56) References Cited

FOREIGN PATENT DOCUMENTS

| CN | 108632004 A | 10/2018 |
|---|---|---|
| CN | 108633098 A | 10/2018 |
| CN | 109526056 A | 3/2019 |
| CN | 109565793 A | 4/2019 |
| CN | 110167072 A | 8/2019 |
| CN | 110545534 A | 12/2019 |
| JP | 2019530268 A | 10/2019 |
| JP | 2019531640 A | 10/2019 |
| RU | 2643349 C1 | 2/2018 |
| WO | 2018077173 A1 | 5/2018 |
| WO | 2018175553 A1 | 9/2018 |
| WO | 2019051782 A1 | 3/2019 |
| WO | 2019226029 A1 | 11/2019 |

OTHER PUBLICATIONS

First Office Action issued in corresponding Japanese Application No. 2022-516768, mailed Oct. 31, 2023.
3GPP TSG RAN WG1 Meeting #98bis; Chongqing, China, Oct. 14-20, 2019; R1-1911552 Source: Intel Corporation; Title: Summary#2 for AI 7.2.4.2.2 Mode-2 Resource Allocation.
3GPP TSG RAN WG1 Meeting #98bis Chongqing, China, Oct. 14-20, 2019; R1-1910653 Source: Intel Corporation; Title: Sidelink physical layer procedures for NR V2X communication.
3GPP TSG-RAN WG1 Meeting #98 Prague, Czech Republic, Aug. 26-30, 2019; R1-1908929 Source: Asia Pacific Telecom; Title: Discussion on sidelink resource allocation mode 2.
Notice of Priority Review of Patent Application issued in corresponding Chinese Application No. 202210290260 1 Issuing, issued on Mar. 24, 2023, 6 pages.
Decision to Grant issued in corresponding Russian Application No. 2022109174, dated Jan. 12, 2023, 22 pages.
First Office Action issued in corresponding Indian application No. 202227010030, mailed Aug. 24, 2022.
Extended European Search Report issued in corresponding European application No. 20909747.6, mailed Oct. 7, 2022.
Fujitsu, "Discussion on Reservation and Sensing based Resource Selection Methods for NR-V2X Sidelink Communication",
R1-1906439, 3GPP TSG RAN WG1 #97 Reno, USA, May 13-17, 2019.
International Search Report issued in corresponding International Application No. PCT/CN2020/070338, mailed Sep. 30, 2020, 32 pages.
Written Opinion of the International Searching Authority issued in corresponding International Application No. PCT/CN2020/070338, mailed Sep. 30, 2020, 7 pages.
"3rd Generation Partnership Project; Technical Specification Group Radio Access Network; Evolved Universal Terrestrial Radio Access (E-UTRA); Physical layer procedures (Release 15)", 3GPP TS 36.213 V15.7.0 (Sep. 2019), 545 pages.
"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.7.0 (Sep. 2019), 134 pages.
"Sidelink Resource Allocation Design for NR V2X Communication", Agenda item: 7.2.4.2.2, Source: Intel Corporation, 3GPP TSG RAN WG1 Meeting #96bis R1-1904296, Xi'an, China, Apr. 8-12, 2019, 15 pages.
"Draft Report of 3GPP TSG RAN WG1 #97 v0.3.0", Source: MCC Support, 3GPP TSG RAN WG1 Meeting #98 R1-190xxxx, Prague, Czech Rep, Aug. 26-30, 2019, 157 pages.
"Resource allocation for NR sidelink Mode 2", Agenda Item: 7.2.4.2.2, Source: TCL Communication, 3GPP TSG RAN WG1 Meeting #99 R1-1912241, Reno, US, Nov. 18-22, 2019, 6 pages.
"Final Report of 3GPP TSG RAN WG1 #96b v1.0.0", Source: MCC Support, 3GPP TSG RAN WG1 Meeting #97 R1-1905921, Reno, USA, May 13-17, 2019, 159 pages.
"Summary of RAN1 Agreements/Working assumptions in WI 5 G V2X w ith NR sidelink", Agenda item: 7 4, Source LG Electronics, 3GPP TSG RAN WG1 #99, R1 1913601, Reno, USA, Nov. 18-22, 2019, 40 pages.
"Discussion on physical layer procedures for NR sidelink", Agenda Item: 7.2.4.5, Source: LG Electronics, 3GPP TSG RAN WG1 Meeting #98 bis R1-1910783, Chongqing, China, Oct. 14-20, 2019, 23 pages.
First Office Action issued in corresponding Chinese Application No. 202210290260.1 issued on Apr. 15, 2023.
Second Office Action issued in corresponding Chinese Application No. 202210290260.1 issued on Jun. 26, 2023.
Notice of Allowance issued in corresponding Japanese Application No. 2022-516768, mailed Mar. 29, 2024.
First Office Action issued in corresponding Korean Application No. 10-2022-7009471, mailed Apr. 17, 2024.

\* cited by examiner

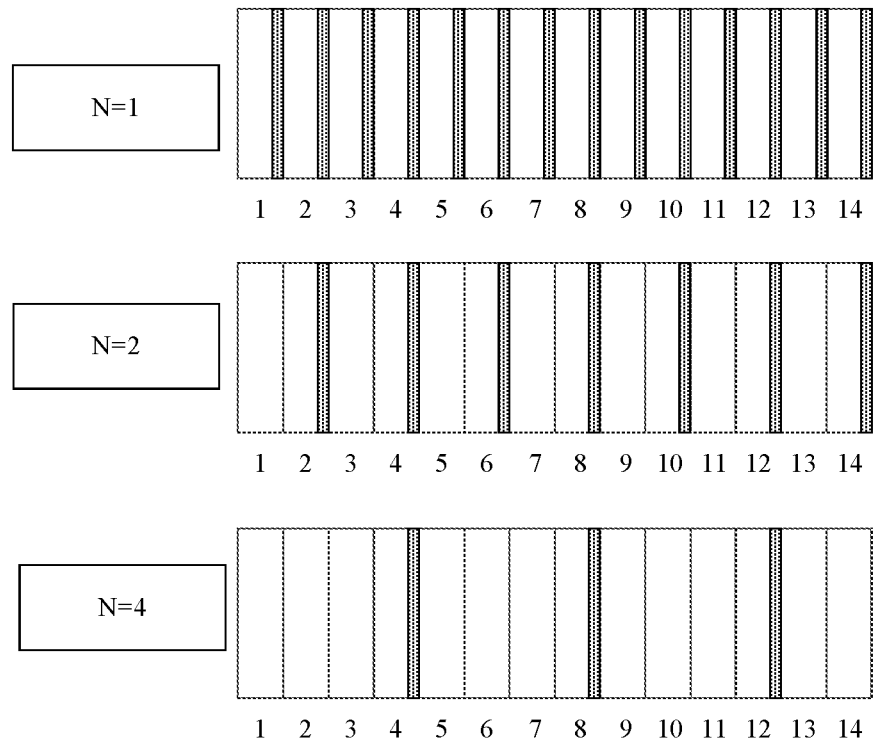
FIG. 7
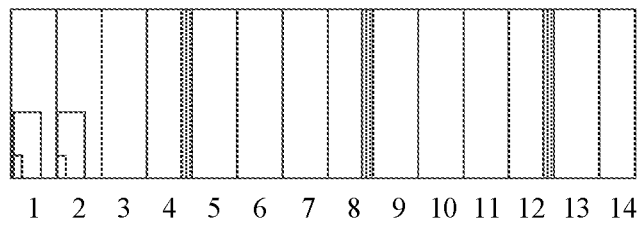
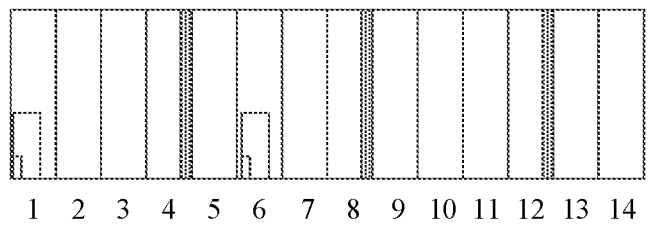
FIG. 8

When there is a service to be transmitted at time n and a resource selection condition is met, select an initial transmission resource for the service from a resource selection window, the initial transmission resource being located between time n and time n+p — 1001

FIG. 10

Determine a first slot interval $s_1-i$ to $s_1+i$, where the $s_1$ is a slot corresponding to the initial transmission resource, and a starting value of $i$ is $R_1$, $R_1$ being an integer not less than 0 — 1101

When a candidate resource located in the first slot interval is present in the first reselection window, determine the first reselection resource with equal probability from the candidate resource located in the first slot interval — 1102

When no candidate resource located in the first slot interval is present in the first reselection window, perform the step of determining the first slot interval $s_1-i$ to $s_1+i$ again after $i$ is added by one — 1103

FIG. 11

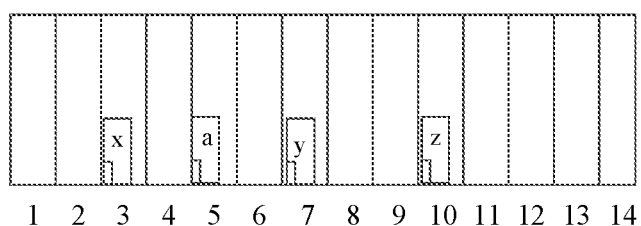

FIG. 12

```
┌─────────────────────────────────────────────────────────────┐
│  When there is a service to be transmitted at time n and a resource │   1001
│  selection condition is met, select an initial transmission resource for the │
│  service from a resource selection window, the initial transmission │
│      resource being located between the time n and time n+p │
└─────────────────────────────────────────────────────────────┘
                              │
                              ▼
┌─────────────────────────────────────────────────────────────┐
│     Select a retransmission resource for the service from the resource │  1002
│  selection window, where the retransmission resource is located after the │
│                    initial transmission resource │
└─────────────────────────────────────────────────────────────┘
```

FIG. 13

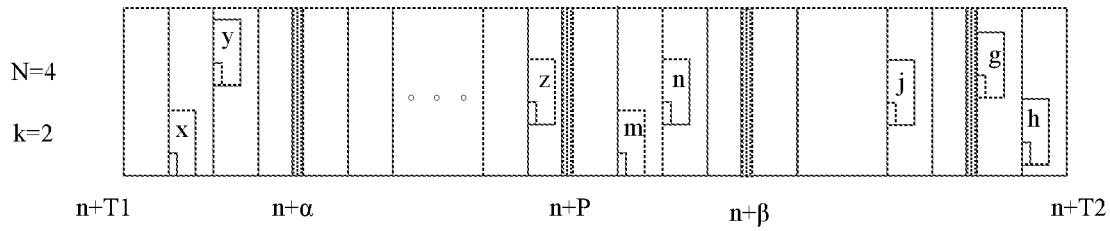

FIG. 14

```
┌─────────────────────────────────────────────────────────────┐
│  Determine a second slot interval $s_2-i$ to $s_2+i$, where $s_2$ is a │
│    slot corresponding to the retransmission resource, and a │  1501
│  starting value of $i$ is $R_2$, $R_2$ being an integer not less than 0 │
└─────────────────────────────────────────────────────────────┘
                              │
                              ▼
┌─────────────────────────────────────────────────────────────┐
│    When the candidate resource located in the second slot │
│       interval is present in the second reselection window, │
│     determine the second reselection resource with equal │   1502
│       probability from the candidate resource located in the │
│                    second slot interval │
└─────────────────────────────────────────────────────────────┘
                              │
                              ▼
┌─────────────────────────────────────────────────────────────┐
│    When no candidate resource located in the second slot │
│       interval is present in the second reselection window, │  1503
│  perform the step of determining the second slot interval $s_2-i$ │
│           to $s_2+i$ again after adding $i$ by one │
└─────────────────────────────────────────────────────────────┘
```

FIG. 15

METHOD AND DEVICE FOR RESOURCE SELECTION IN VEHICLE NETWORKING SYSTEM, TERMINAL AND MEDIUM

CROSS-REFERENCE TO RELATED APPLICATION

This application is a continuation of International Application No. PCT/CN2020/070338, filed Jan. 3, 2020, entitled "METHOD AND DEVICE FOR RESOURCE SELECTION IN VEHICLE NETWORKING SYSTEM, TERMINAL AND MEDIUM", the contents of which are incorporated herein by reference in its entirety.

TECHNICAL FIELD

The present application relates to the field of wireless communication, and in particular, to a method and a device for resource selection in a vehicle to everything system, a terminal and a medium.

BACKGROUND

To realize direct communication between terminals in a vehicle to everything (V2X) system, side link (SideLink, SL) transmission mode is introduced.

In a transmission mode of SL, the terminal needs to select resources in a resource pool. The terminal determines a resource selection window and a resource listening window, and excludes resources from the resource selection window based on a listening result of the resource listening window, to obtain candidate resources for a service to be transmitted. The terminal randomly selects resources from the candidate resources to perform a transmission of the service to another terminal for receiving the service, where the transmission includes an initial transmission and a retransmission for the service.

When selecting the initial transmission resource for the service by the above method, the terminal randomly selects a resource from the entire resource selection window, therefore the initial transmission resource selected may be a candidate resource located at a relatively rearward position in time domain, which results in a large delay of service transmission.

SUMMARY

The embodiments of the present application provide a method and apparatus for resource selection in a vehicle to everything system, a terminal and a medium, which can be used to solve the problem of a large service transmission delay, which is due to that the terminal randomly selects the resource from an entire resource selection window and then an initial transmission resource selected may be a candidate resource located at a relatively rearward position in time domain. The technical solutions are described as below.

According to one aspect of the present application, there is provided a method for resource selection in a vehicle to everything system, including:

when there is a service to be transmitted at time n, selecting an initial transmission resource for the service from a resource selection window, the initial transmission resource being located between the time n and time n+p; and where the resource selection window is a window from time $n+T_{11}$ to time $n+T_{12}$, a first time period from the time n to the time $n+T_{11}$ is greater than or equal to a processing delay of the terminal, a second time period from the time n to the time $n+T_{12}$ is less than or equal to a required delay range of the service, and a value of p is less than a preset value W.

According to one aspect of the present application, there is provided a method for resource selection in a vehicle to everything system, including:

when there is a service to be transmitted at time n, selecting a retransmission resource for the service from a resource selection window, the retransmission resource being located after the initial transmission resource for the service; and where the resource selection window is a window from time $n+T_{11}$ to time $n+T_{12}$, a first time period from the time n to the time $n+T_{11}$ is greater than or equal to a processing delay of the terminal, a second time period from the time n to the time $n+T_{12}$ is less than or equal to a required delay range of the service.

According to one aspect of the present application, there is provided an apparatus for resource selection in a vehicle to everything system, where the apparatus includes a determining module;

the determining module is configured to, when there is a service to be transmitted at the time n, select an initial transmission resource for the service from a resource selection window, the initial transmission resource being located between time n and time n+p; and where the resource selection window is a window from time $n+T_{11}$ to time $n+T_{12}$, a first time period from the time n to the time $n+T_{11}$ is greater than or equal to a processing delay of the terminal, a second time period from the time n to the time $n+T_{12}$ is less than or equal to a required delay range of the service, and a value of p is less than a preset value W.

According to one aspect of the present application, there is provided an apparatus for resource selection in a vehicle to everything system, where the apparatus includes a determining module;

the determining module is configured to, when there is a service to be transmitted at a time n, select a retransmission transmission resource for the service from a resource selection window, the retransmission transmission resource being located after an initial transmission resource for the service; and where the resource selection window is a window from time $n+T_{11}$ to time $n+T_{12}$, a first time period from the time n to the n+time $T_{11}$ is greater than or equal to a processing delay of a terminal, and a second time period from the time n to the time $n+T_{12}$ is less than or equal to a required delay range of the service.

According to one aspect of the present application, there is provided a terminal, the terminal includes a processor; a transceiver connected to the processor; and a memory configured to store executable instructions of the processor; where the processor is configured to load and execute the executable instructions to implement the method for resource selection in the vehicle to everything system according to any one of the proceeding aspects.

According to one aspect of the present application, there is provided a computer-readable storage medium, where executable instructions are stored in the readable storage medium, and the executable instructions are loaded and executed by a processor to implement the method for resource selection in the vehicle to everything system according to any one of the proceeding aspects.

The technical solutions provided by the embodiments of the present application at least include the following beneficial effects.

When the terminal selects a resource from the resource selection window, by selecting the initial transmission resource for the service between time n and time n+p, the initial transmission of the service by the resource located at a relatively rearward time domain position in the resource selection window is avoided, and the delay of service transmission is reduced.

BRIEF DESCRIPTION OF THE DRAWINGS

To illustrate the technical solutions in the embodiments of the present application more clearly, the drawings that need to be used in the description of the embodiments will be briefly introduced below. It is obvious that the drawings in the following description are only for some embodiments of the present application, and for those skilled in the art, other drawings may also be obtained based on these drawings without creative labor.

FIG. 7 is a schematic diagram of resource selection in a vehicle to everything system in a related technology of the present application.

FIG. 8 is a schematic diagram of resource selection in a vehicle to everything system in a related technology of the present application.

FIG. 10 is a flowchart of a method for resource selection in a vehicle to everything system provided by an exemplary embodiment of the present application.

FIG. 11 is a flowchart for determining a first reselection resource from a first reselection window provided by an exemplary embodiment of the present application.

FIG. 12 is a schematic diagram of resource selection in a vehicle to everything system provided by an exemplary embodiment of the present application.

FIG. 13 is a flowchart of a method for resource selection in a vehicle to everything system provided by an exemplary embodiment of the present application.

FIG. 14 is a schematic diagram of resource selection in the vehicle to everything system provided by an exemplary embodiment of the present application.

FIG. 15 is a flowchart of determining a second reselection resource for a retransmission resource from a second reselection window provided by an exemplary embodiment of the present application.

DETAILED DESCRIPTION

To make the purposes, technical solutions, and advantages of the present application more clearly, the embodiments of the present application will be further described in detail below with reference to the accompanying drawings.

First, terms involved in the embodiments of the present application will be introduced in brief.

Vehicle to everything (V2X): which is the key technology of the future intelligent transportation system, and mainly studies the vehicle data transmission solution based on the 3GPP communication protocol. V2X communication includes vehicle to vehicle (V2V) communication, vehicle to infrastructure (V2I) communication, and vehicle to people (V2P) communication. V2X applications may improve driving safety, reduce congestion and vehicle energy consumption, and improve traffic efficiency.

Figure 1:
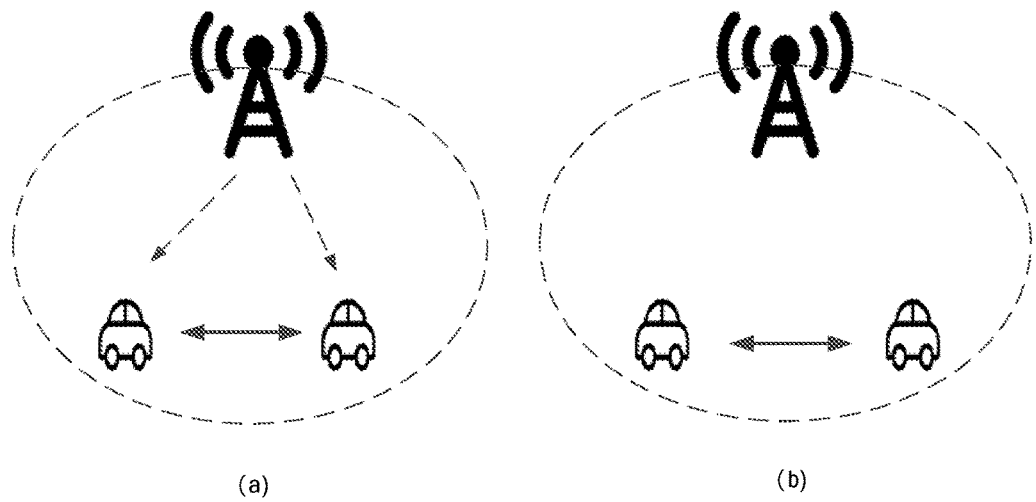
FIG. 1 is a schematic diagram of a transmission mode of sidelink in a related technology of the present application.

SideLink (SL) transmission: which is a device-to-device communication method with relatively high spectrum efficiency and relatively low transmission delay. In 3GPP, two modes of sidelink transmission are defined: mode A and mode B. As shown in (a) of FIG. 1, in mode A, transmission resources of a terminal are allocated by a base station through downlink, and the terminal sends data on sidelink based on the resources allocated by the base station; and the base station may allocate a resource for a single transmission to the terminal, or may allocate a resource for a semi-static transmission to the terminal. As shown in (b) of FIG. 1, in mode B, the terminal selects one resource from a resource pool for data transmission by itself. Specifically, the terminal may select a transmission resource from the resource pool by means of listening, or may select a transmission resource from the resource pool by means of random selection.

In mode B of sidelink transmission modes, the terminal may select a transmission resource from the resource pool by means of listening. Methods for resource selection in LTE-V2X and in NR-V2X will be described in the following.

1) Method for Resource Selection in LTE-V2X

When a new data packet arrives at time n, resource selection is required, and the terminal may select a resource within [n+T1, n+T2] ms based on a listening result in the past one second, where $T1<=4$, $20<=T2<=100$, $T_1$ should be selected to be greater than a processing delay of the terminal, and $T_2$ needs to be selected to be within a required delay range of a service.

For example, if the required delay range of the service is 50 ms, then $20<=T2<=50$, and if the required delay range of the service is 100 ms, then $20<=T2<=100$.

Figure 2:
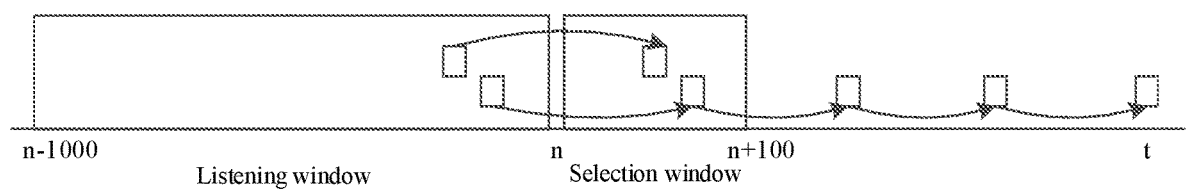
FIG. 2 is a schematic diagram of selecting a resource in LTE-V2X in a related technology of the present application.

Exemplarily, as shown in FIG. 2, a new data packet arrives at time n, resource selection is required, and the resource listening window is [n−1000, n]. The required delay of the service is 100 ms, and the resource selection window is [n+4, n+100].

The process of resource selection by the terminal in the resource selection window is as below (the detail process of resource selection may refer to the operation steps in 3GPP TS36.213, and several main steps of resource selection are listed herein).

The terminal takes all available resources in the resource selection window as a set A, and the terminal performs excluding operation for resources in the set A.

In step 1, if the terminal sends data on some subframes in the resource listening window without listening, then resources on subframes in the resource selection window that are corresponding the above-mentioned some subframes are excluded.

In step 2, if the terminal has detected (found) a physical sidelink control channel (PSCCH) within the resource listening window, then it measures a reference signal received power (RSRP) of a physical sidelink shared channel (PSSCH) scheduled by the PSCCH, and if the measured PSSCH-RSRP is higher than a PSSCH-RSRP threshold, and it is determined that a transmission resource reserved by the PSCCH is within the resource selection window of the terminal based on reservation information in control information transmitted in the PSCCH, then the terminal excludes the resource from the set A. The selection of the PSSCH-RSRP threshold is determined by the priority information carried in the detected PSCCH and the priority of the data to be transmitted by the terminal.

In step 3, if the number of remained resources in the set A is less than 20% of a total number of resources, then the terminal raises the PSSCH-RSRP threshold by 3 dB, and repeats the steps 1 to 2 until the number of remained resources in the set A is greater than 20% of the total number of resources.

In step 4, the terminal performs a sidelink received signal strength indicator (S-RSSI) detection for the remained resources in the set A, sorts the remained resources in the set A based on energy level, and puts 20% (relative to the number of resources in the set A) of the resources which are with the lowest energy into a set B.

In step 5, the terminal selects one resource from the set B with equal probability for data transmission.

2) Method for Resource Selection by Listening in NR-V2X

In NR-V2X, automatic driving needs to be supported, therefore relatively high requirements are put forward for data interaction between vehicles, such as relatively high throughput, relatively low latency, relatively high reliability, relatively large coverage, and relatively flexible resource allocation, etc.

Figure 3:
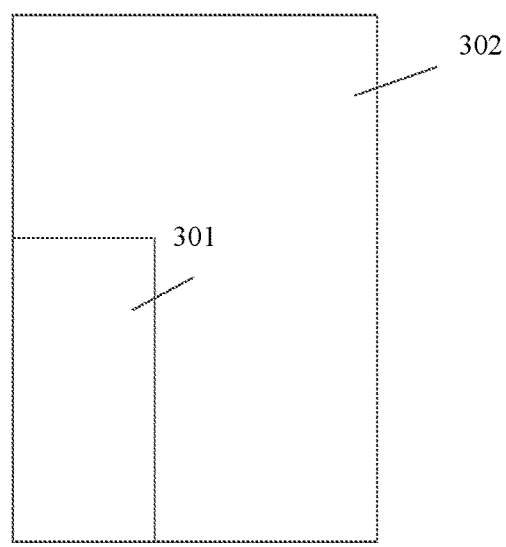
FIG. 3 is a structural block diagram of a physical layer of NR-V2X in a related technology of the present application.

The physical layer structure of NR-V2X is shown in FIG. 3, PSCCH301 for transmitting control information is included in PSSCH302 for transmitting data, which also means that PSCCH301 and PSSCH302 must be sent at the same time.

In the current standard, it only supports that the initial transmission of a current transport block (TB) reserves a retransmission of the current TB, the retransmission of the current TB reserves the retransmission of the current TB, and an initial transmission or a retransmission of a previous TB reserves the initial transmission of the current TB.

Figure 4:
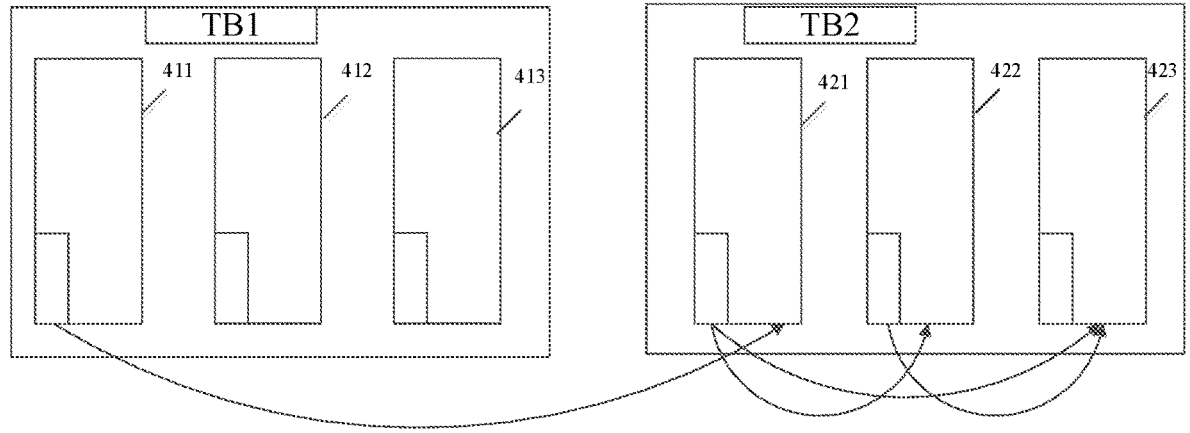
FIG. 4 is a schematic diagram of a transmission of TB in a related technology of the present application.

As shown in FIG. 4, the current TB is TB2, and the previous TB is TB1. The initial transmission 421 of TB2 reserves the retransmission 422 and the retransmission 423 of TB2, the retransmission 422 of TB2 reserves the retransmission 423 of TB2, the initial transmission 411 of TB1 reserves the initial transmission 421 of TB2, the retransmission 412 of TB1 reserves the retransmission 422 of TB2, and the retransmission 413 of TB1 reserves retransmission 423 of TB2.

In NR-V2X, in the above-mentioned mode B, the terminal also needs to select a resource by itself. The resource selection mechanism thereof is similar to the resource selection mechanism in above-mentioned LTE-V2X.

The terminal generates a data packet of a service at time n and needs to perform resource selection, and takes all resources in a resource selection window as a set A. The resource selection window starts from n+T1 and ends at n+T2. T1>=the time that the terminal prepares to send data and selects a resource, T2 min<=T2<=a required delay range of the service. The value of T2 min is $\{1, 5, 10, 20\} *2^{\mu}$ slots, where $\mu=0,1,2,3$ corresponds to the case where a subcarrier spacing is 15, 30, 60, 120 kHz.

Figure 5:
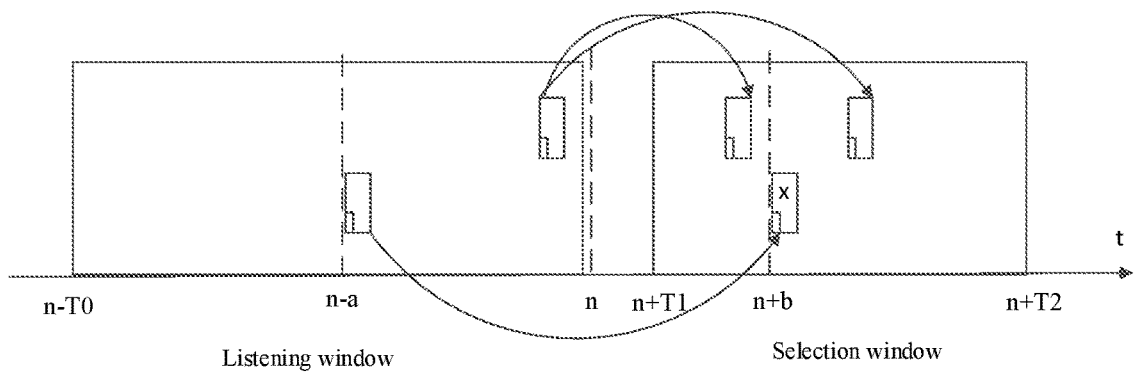
FIG. 5 is a schematic diagram of resource selection in a vehicle to everything system in a related technology of the present application.

As shown in FIG. 5, the terminal performs resource listening from time n−T0 to time n, and the value range of T0 is [100, 1100] ms. If the terminal hears a PSCCH, then it measures a RSRP of the PSCCH or a RSRP of a PSSCH scheduled by the PSCCH, and if the measured RSRP is greater than a RSRP threshold, and it is determined that a resource reserved by the PSCCH is within the resource selection window based on resource reservation information in control information transmitted in the PSCCH, then the resource is excluded from the set A.

After resource exclusion, the terminal randomly selects several resources from the set A as its sending resources for the initial transmission and the retransmission. The above-mentioned RSRP threshold is determined by the priority carried in the PSCCH which is heard by the terminal and the priority of the data to be sent by the terminal.

In addition, a difference between a time domain position of an initial transmission resource selected by the terminal and a time domain position of a last retransmission resource needs to be less than or equal to W. In NR-V2X, W is equal to 32 slots. The length of each slot is related to the sub-carrier spacing, and if the sub-carrier spacing is 15 kHz, then the slot length is 1 millisecond (ms), and if the sub-carrier spacing is 30 kHz, then the slot length is 0.5 ms.

It should be noted that resource preemption is supported in NR-V2X, i.e., after the terminal excludes the resources, the set A may include a resource block reserved by a low-priority terminal, and the terminal preempts the resource block reserved by the low-priority terminal.

For example, resource preemption may be achieved by adjusting the RSRP threshold.

Assuming that in FIG. 5, terminal 1 generates data and selects a resource at time n, and terminal 1 determines a resource selection window from n+T1 to n+T2 and a resource listening window from n−T0 to n. In the resource listening window, terminal 1 hears that terminal 2 sends a PSCCH and a PSSCH at time n−α and reserves resource x at time n+b. After hearing the PSCCH sent by terminal 2, terminal 1 learns that the priority carried in the PSCCH of terminal 2 is lower than the priority of the data to be sent by itself, therefore it raises the RSRP threshold, so that the probability that the measured RSRP by which terminal 2 sends a signal is lower than the RSRP threshold is increased, and when the measured RSRP is lower than the RSRP threshold, terminal 1 does not exclude resource x reserved by terminal 2. If terminal 1 randomly selects resource x reserved by terminal 2 in set A within which resources have been excluded, then terminal 1 preempts resource x. Conversely, if terminal 1 has detected that the priority carried in the PSCCH of terminal 2 is higher than the priority of the data to be sent by itself, then it lowers the RSRP threshold, so that the resource reserved by terminal 2 is easier to be excluded, thereby avoiding using a same resource block together with a terminal with high-priority.

In addition, in NR-V2X, re-evaluation after initial resource selection is supported.

Figure 6:
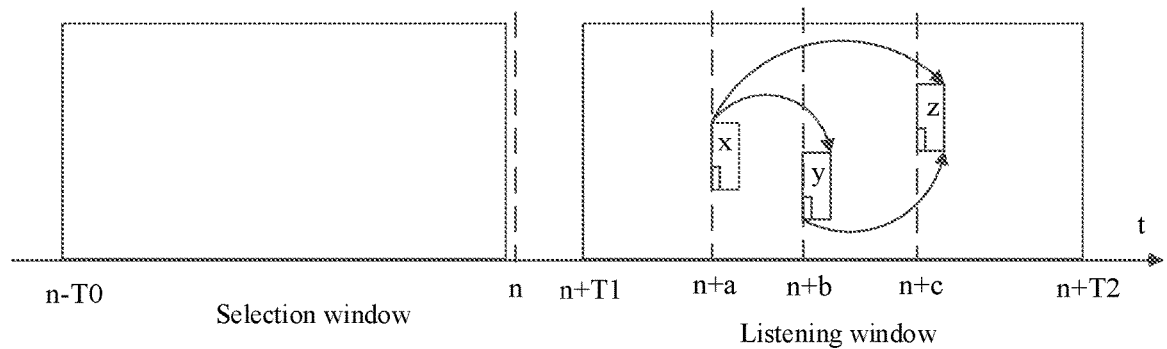
FIG. 6 is a schematic diagram of resource selection in a vehicle to everything system in a related technology of the present application.

As shown in FIG. 6, the terminal generates data at time n and determines a resource listening window and a resource selection window of the resource for resource selection, and the terminal selects an initial transmission resource x at time n+$\alpha$, and retransmission resources y and z at time n+b and time n+c. After time n, the terminal still re-evaluates the PSCCH. Before time n+$\alpha$, if the terminal learns that resource x, resource y or resource z is reserved by other terminal through re-evaluation (i.e., a conflict occurs in the resource), and the measured RSRP is higher than the RSRP threshold, then the terminal may release the corresponding resource, and may reselect another resource on the premise that the required service delay is met. After time n+$\alpha$, since the terminal has sent PSCCH and PSSCH on resource x and has reserved resource y and resource z, the terminal may release resource y or resource z and reselect resources, only if the terminal finds that a UE with a high priority preempts resource y or resource z through re-evaluation and the RSRP is higher than the RSRP threshold.

When retransmitting a resource, there are blind retransmission mode and hybrid automatic repeat quest (HARQ) retransmission mode.

1) Blind retransmission: the terminal selects a plurality of time-frequency resources at one time and sends the same data each time, and a terminal for receiving the service does not feed back for each transmission of the terminal, but only combines the received data.
2) HARQ retransmission: the terminal selects a plurality of time-frequency resources at one time and sends the same data each time. For each transmission, the terminal for receiving the service feeds back ACK/NACK to the terminal based on whether the reception is successful or not, where ACK represents a successful reception and NACK represents a failed reception. In NR V2X, after the terminal receives ACK, it stops sending data and releases time-frequency resources that have not been used. The receiving end performs a HARQ feedback for the sending end through a physical sidelink feedback channel (PSFCH).

PSFCH resources are configured for each resource pool. In NR-V2X, there are three configurations, i.e., N=1, N=2 and N=4. As shown in FIG. 7, N=1 means that each slot in a resource pool is configured with a PSFCH resource, N=2 means that every two slots are configured with a PSFCH resource, and N=4 means that every four slots are configured with a PSFCH resource.

When terminal 1 sends data to terminal 2 in a slot t, then the HARQ feedback by terminal 2 to terminal 1 for this data transmission occurs in a slot t+$\alpha$, where $\alpha$ is greater than or equal to K, slot t+$\alpha$ includes a PSFCH resource, and k takes 2 or 3 slots in NR-V2X.

Referring to FIG. 7, assuming that N=4 (i.e., every four slots are configured with a PSFCH resource) and k=2, if terminal 1 sends data to terminal 2 in slot 1, then t+$\alpha$ is slot 4, and terminal 2 performs a HARQ feedback for terminal 1 in slot 4. If terminal 1 sends data to terminal 2 in slot 3, then t+$\alpha$ is slot 8, and terminal 2 performs a HARQ feedback for terminal 1 in slot 8.

In the existing NR V2X standard, it is not clearly stipulated whether to support the receiving terminal to perform a 1-bit HARQ feedback on a same PSFCH resource for multiple transmissions of the current TB by the sending terminal, when a HARQ retransmission is activated.

When the terminal for receiving the service is supported to perform a 1-bit HARQ feedback on a same PSFCH resource for multiple transmissions of the current TB by the terminal (denoted as case 1), as shown in subgraph 1 of FIG. 8, assuming that N=4 (i.e., every four slots are configured with a PSFCH resource) and k=2, after the terminal sends an initial transmission to the receiving terminal in slot 1, it may perform a retransmission in slot 2, and the terminal for receiving the service may perform a HARQ feedback for the initial transmission and the retransmission by the terminal in slot 4.

When the terminal for receiving the service is supported to perform a 1-bit HARQ feedback on one PSFCH resource for one transmission of the current TB by the terminal (denoted as case 2), as shown in subgraph 2 of FIG. 8, assuming that N=4 and k=2, after the terminal sends an initial transmission to the terminal for receiving the service in slot 1, the terminal that needs to receive the service performs a HARQ feedback for this initial transmission in slot 4, and then the terminal performs a retransmission in slot 6. Thereafter, the terminal for receiving the service performs a HARQ feedback for the retransmission by the terminal in slot 8.

It can be obtained from the above analysis that in case 1, for multiple transmissions of one TB, there is no required time interval between two adjacent transmissions. In case 2, for multiple transmissions of one TB, at least one PSFCH resource needs to be included between two adjacent transmissions. Therefore, with respect to the above two cases, it is necessary to design the resource selection algorithms respectively.

Figure 9:
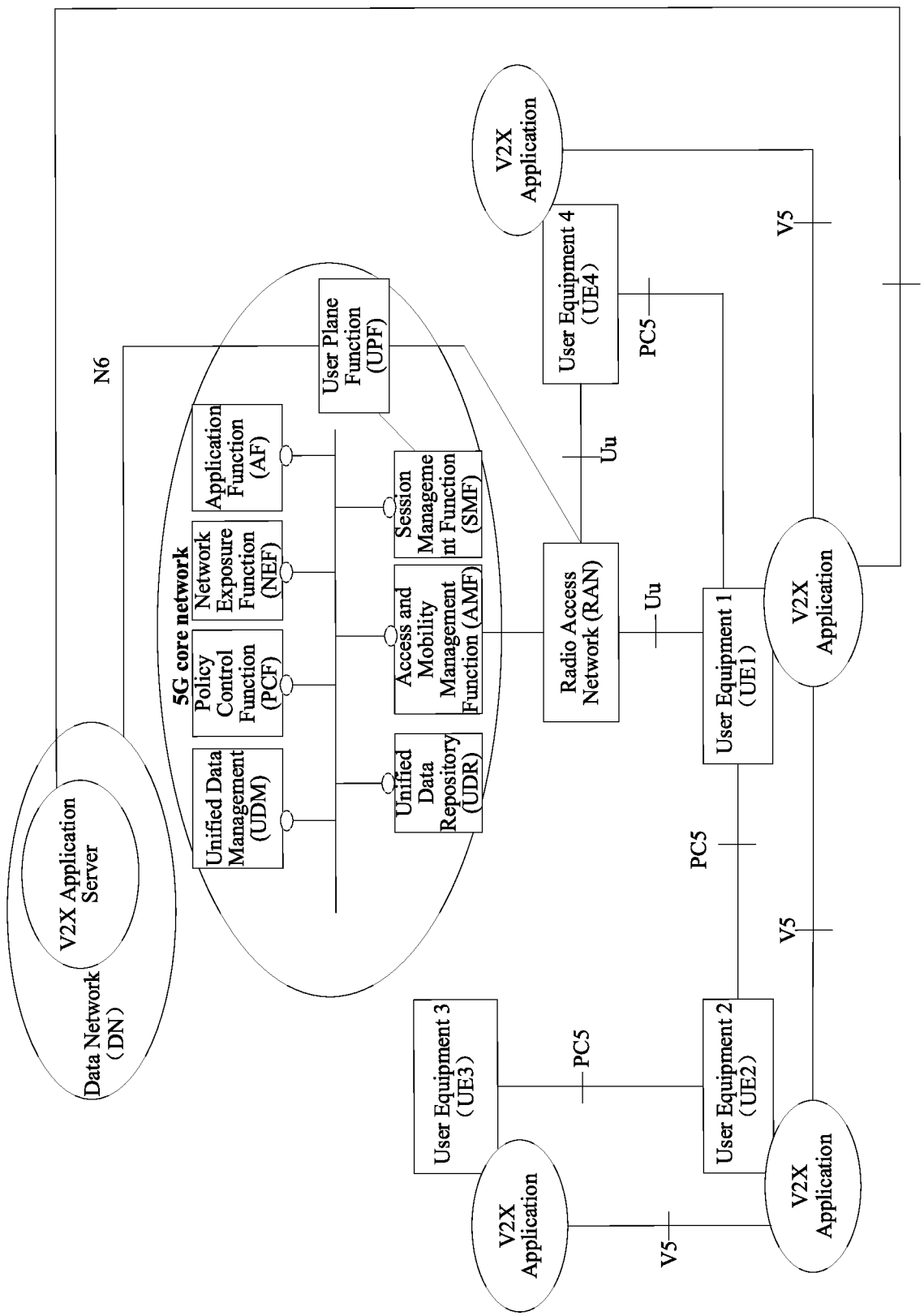
FIG. 9 is a block diagram of a communication system supporting sidelink transmission provided by an exemplary embodiment of the present application.

FIG. 9 shows a block diagram of a communication system supporting a sidelink transmission provided by an exemplary embodiment of the present application. The communication system may be a schematic diagram of a non-roaming 5G system architecture, and the system architecture may be applied to a vehicle to everything (V2X) service using D2D technology.

The system architecture includes a data network (DN), in which a V2X application server required for a V2X service is provided. The system architecture also includes a 5G core network, and the network functions of the 5G core network include: unified data management (UDM), policy control function (PCF), network exposure function (NEF), application function (AF), unified data repository (UDR), access and mobility management function (AMF), session management function (SMF) and user plane function (UPF).

The system architecture also includes a new generation-radio access network (NG-RAN) and four user equipment (i.e., user equipment 1 to 4) shown exemplarily, where each user equipment is provided with a V2X application. The NG-RAN is provided with one or more access network equipment, such as a base station (gNB). The user equipment performs uplink transmission to the access network equipment.

In the system architecture, the data network is connected with the UPF of the 5G core network through N6 reference point, and the V2X application server is connected with the V2X application in the user equipment through V1 reference point; the NG-RAN is connected with the AMF and the UPF of the 5G core network, and the NG-RAN is connected with user equipment 1 and user equipment 5 through Uu reference point respectively; and sidelink transmission between multiple user equipment is performed through PC5 reference point, and multiple V2X applications are connected through V5 reference point. The above-mentioned reference points may also be referred to as "interfaces".

FIG. 10 shows a flowchart of a method for resource selection in a vehicle to everything system provided by an exemplary embodiment of the present application. The method may be performed by user equipment in V2X as shown in FIG. 9, the user equipment serves as a terminal for sending a service when performing the method, and the method includes the following steps.

In step 1001, when there is a service to be transmitted at time n, an initial transmission resource for the service is selected from a resource selection window, the initial transmission resource being located between time n and time n+p.

The resource selection window is a window from time $n+T_{11}$ to time $n+T_{12}$, a first time period from time n to time $n+T_{11}$ is greater than or equal to a processing delay of the terminal, a second time period from time n to time $n+T_{12}$ is less than or equal to a required delay range of the service, and a value of p is less than a preset value W.

Optionally, if a plurality of resources for transmitting the service are present in the resource selection window, then the terminal performs resource selection only when a resource selection condition is met.

In the V2X system, two terminals communicate with each other by means of sidelink. Specifically, the two terminals adopt mode B of sidelink, i.e., the terminal selects a resource from a resource pool for data transmission by itself. If there is a service to be transmitted by the terminal at time n, then the terminal may perform resource selection in the resource selection window from time $n+T_{11}$ to time $n+T_{12}$ to select an initial transmission resource which is a time-frequency resource between time n and time n+p. The terminal uses the initial transmission resource to transmit the service to another terminal for the first time.

Optionally, if there is a service to be transmitted by the terminal at time n and there is no initial transmission resource that meets the resource selection condition, then the terminal raises a RSRP threshold (such as by 3 db) until a resource that meets the resource selection condition presents, so as to ensure that the service is transmitted to a receiving terminal within a required delay range of the service.

Optionally, the preset value W is not less than the difference between a time domain position of the initial transmission resource and a time domain position of a last retransmission resource selected by the terminal.

Optionally, the above-mentioned preset value W is equal to 32 slots. The length of each slot is related to the subcarrier spacing, as shown in Table 1.

TABLE 1

Mapping relationship between slot length and subcarrier spacing

| Subcarrier spacing (KHz) | Slot length (ms) |
|---|---|
| 15 | 1 |
| 30 | 0.5 |
| 60 | 0.25 |
| 120 | 0.125 |
| 240 | 0.0625 |

As shown in Table 1, if the subcarrier spacing is 15 KHz, then the slot length is 1 ms, and the preset value W is 32 ms; and if the subcarrier spacing is 30 kHz, then the slot length is 0.5 ms, and the preset value W is 16 ms.

In one example, the selecting the initial transmission resource for the service from the resource selection window includes: determining a resource listening window and a resource selection window; excluding resources from the resource selection window to obtain candidate resources in the resource selection window, based on a listening result of the resource listening window; and selecting the initial transmission resource for the service from the candidate resources.

Optionally, the resource listening window is a window from time $n-T_0$ to time n. The value of $T_0$ is [100,1100] ms.

Optionally, selecting the initial transmission resource for the service from the candidate resources may be: determining the initial transmission resource for the service with equal probability from the candidate resources.

Optionally, the time-frequency positions of the candidate resources may be partially overlapped.

Exemplarily, after excluding resources from the resource selection window, the terminal obtains four candidate resources in the resource selection window: resource 1, resource 2, resource 3 and resource 4. The terminal selects an initial transmission resource for the service with equal probability from the four resources. The probability of selecting resource 1, resource 2, resource 3 and resource 4 respectively as the initial transmission resource is 0.25.

Optionally, the terminal takes all available resources in the resource selection window as set A, and excludes resources from the resource selection window based on the listening result of the resource listening window, i.e., performs exclusion for the resources in set A, which includes at least one of the following steps.

In step 1, if the terminal sends data in some slots within the resource listening window without listening, then resources on the corresponding slots within the resource selection window are excluded.

In step 2, if the terminal has detected a PSCCH within the resource listening window, then it measures a RSRP of a PSSCH scheduled by the PSCCH or a RSRP of the PSCCH, and if the measured PSSCH-RSRP is higher than a RSRP threshold, and it is determined that a transmission resource reserved by the PSCCH is within the resource selection window of the terminal based on reservation information in control information transmitted in the PSCCH, then the terminal excludes the resource from set A. The selection of the RSRP threshold is determined by the priority information carried in the detected PSCCH and the priority of service data to be transmitted by the terminal.

In step 3, if the number of remained resources in set A is less than 20% of a total number of resources, then the terminal raises the RSRP threshold by 3 dB, and repeats steps 1 to 2 until the number of remained resources in set A is greater than 20% of the total number of resources.

Optionally, the resources in set A after the above-mentioned steps are the remained resources after excluding resources from the resource selection window, i.e., the candidate resources.

Optionally, after obtaining the candidate resources by resource exclusion, when the terminal selects a resource from the candidate resources, resource preemption for a resource reserved by a low-priority terminal is supported.

Exemplarily, the process of resource preemption is described as above in the embodiment corresponding to FIG. 5.

In one example, the terminal re-evaluates (listens continuously) the initial transmission resource; and when a conflict occurs in the initial transmission resource, the terminal determines a first reselection resource for the initial transmission resource from a first reselection window.

The first reselection window is a window from time $n+t_1+T_{21}$ to time $n+t_1+T_{21}$, the first reselection resource is a time frequency resource in the candidate resources of the first reselection window that has a distance from the initial transmission resource less than or equal to a distance i, i being an integer not less than 0, time $n+t_1$ is the moment when it is determined that the conflict occurs in the initial transmission resource, and the candidate resources are a set of resources in the first reselection window which have not been excluded after exclusion based on a listening result of the resource listening window.

It should be noted that when there is more than one time-frequency resource in the candidate resources of the first reselection window that has a distance from the initial transmission resource less than or equal to the distance i, then the terminal selects one time-frequency resource as the first reselection resource from them with equal probability.

Optionally, the initial transmission resource is located at time n+b which is between time n and time n+p, and the terminal re-evaluating the initial transmission resource means that the terminal listens to resources in each slot during a time period from time n to time n+b, so as to determine whether other terminal also reserves the initial transmission resource or not.

Optionally, a first time period from time $n+t_1$ to time $n+t_1+T_{21}$ is greater than or equal to a processing delay of the terminal, and a second time period from time $t_1$ to time $n+t_1+T_{22}$ is less than or equal to a required delay range of the service.

Exemplarily, $t_1$ is 100 ms, and the terminal determines that the conflict occurs in the initial transmission resource at n+100 ms; the processing delay of the terminal is 10 ms, and the first time period from time $n+t_1$ to time $n+t_1+T_{21}$ is equal to the processing delay of the terminal, which is also 10 ms; and the required delay range of the service is 1000 ms, the second time period from time n to time $n+t_1+T_{22}$ is equal to the required delay range of the service, and $T_{22}$ is 900 ms. The first reselection window is a window from time $n+t_1+10$ to time $n+t_1+900$.

The conflict occurring in the initial transmission resource means that during re-evaluation, the initial transmission resource selected by the terminal is also reserved by other terminal as an initial transmission resource or a retransmission resource for transmitting other service.

Optionally, when a conflict occurs in an initial transmission resource of terminal UE1, terminal UE1 measures a RSRP of other terminal UE2 in conflict, and only when the measured RSRP of UE2 is higher than a RSRP threshold of UE1, terminal UE1 reselects a resource and determines a first reselection resource. The above-mentioned RSRP threshold is determined by the priority carried in a PSCCH heard by terminal UE1 and the priority of service data to be transmitted.

After determining that the conflict occurs in the initial transmission resource, the terminal releases the initial transmission resource, determines a window from time $n+t_1+T_{21}$ to time $n+t_1+T_{22}$ as a first reselection window, and excludes resources from the first reselection window to obtain candidate resources based on a listening result of the first resource listening window, where the process of exclusion is described as above. The first resource listening window is a window from time $n+t_1-T_0$ to time $n+t_1$.

Referring to FIG. 11, the determining the first reselection resource from the candidate resources in the first reselection window may include the following steps.

In step 1101, a first slot interval $s_1-i$ to $s_1+i$ is determined, where $s_1$ is a slot corresponding to the initial transmission resource, and a starting value of i is $R_1$, $R_1$ being an integer not less than 0.

In step 1102, when a candidate resource located in the first slot interval is present in the first reselection window, the first reselection resource is determined with equal probability from the candidate resources located in the first slot interval.

In step 1103, when no candidate resource located in the first slot interval is present in the first reselection window, the step of determining the first slot interval $s_1-i$ to $s_1+i$ is performed again after i is added by one.

Exemplarily, with reference to FIG. 12, the candidate resources include resource x, resource y, and resource z. The slot corresponding to the initial transmission resource α is slot 5, the starting value of i is 1, the first slot interval is slot 4 to slot 6, and no candidate resource is present in the first reselection window. With i being added by one (i.e., i+1), the terminal determines that the first slot interval is from slot 3 to slot 7. At this time, two candidate resources are present in the first slot interval: resource x and resource y, and the terminal randomly selects one of the two candidate resources with equal probability as the first reselection resource.

Optionally, the first reselection resource and a resource which has been selected are located at different time, and the resource which has been selected is a resource selected by the terminal for other transmission of a current TB.

Optionally, the current TB is a transport block corresponding to the service to be transmitted that is present at time n. The current TB may include multiple transmissions, including an initial transmission and at least one retransmission.

If resource m is a retransmission resource selected by the terminal for the retransmission of the current TB, then the terminal does not take resource m as the first reselection resource when performing reselection for an initial transmission resource.

In summary, in the method provided by the present embodiment, when the terminal selects a resource from the resource selection window, by means of selecting the initial transmission resource for the service between time n and time n+p, the initial transmission of the service by the candidate resource located at a relatively rearward time domain position in the resource selection window is avoided, and the delay of service transmission is reduced.

Meanwhile, in the method provided by the present embodiment, when performing resource reselection for the initial transmission resource in conflict based on re-evaluation, the terminal determines a time-frequency resource, which is located close to the original initial transmission resource in time domain, from the remained resources after resource exclusion as a reselection resource. Since the position of the initial transmission resource is between time n and time n+p, the case that the time domain position of the reselection resource is relatively rearward in the resource selection window is avoided, and the timeliness of service transmission is guaranteed again.

In an optional embodiment based on FIG. 10, FIG. 13 shows a flowchart of a method for resource selection in a V2X system provided by an exemplary embodiment of the present application. In the present embodiment, the method further includes step 1002.

In step 1002, a retransmission resource for the service is selected from the resource selection window, where the retransmission resource is located after the initial transmission resource.

Optionally, the terminal excludes resources from the resource selection window to obtain candidate resources in the resource selection window, based on a listening result of the resource listening window, and selects a retransmission resource for the service from the candidate resources. On the retransmission resource, the terminal transmits the service to the terminal for receiving the service again.

Optionally, there are two modes of resource retransmission: HARQ feedback and blind retransmission.

Blind retransmission means that the terminal selects multiple time-frequency resources at one time and sends same data of one service each time, and the terminal for receiving the service does not feed back for each transmission of the terminal, but only combines the received data.

HARQ feedback means that the terminal selects multiple time-frequency resources at one time and sends same data each time. For each transmission, the receiving terminal feeds back ACK/NACK to the terminal based on whether the reception is successful or not, where ACK represents a successful reception and NACK represents a failed reception. After the terminal receives ACK, it stops sending data and releases time-frequency resources that have not been used. The receiving terminal performs a HARQ feedback for the terminal through a PSFCH, i.e., a sidelink feedback channel.

There are two cases when activating a HARQ feedback to retransmit a resource.

Case 1: the retransmission resource for the service is determined from the resource selection window, when a hybrid automatic repeat request (HARQ) feedback is active, and the terminal for receiving the service is allowed to perform a 1-bit HARQ feedback on a same PSFCH resource for at least two transmissions of the current TB by the terminal.

Case 2: the retransmission resource for the service is determined from the resource selection window, when a hybrid automatic repeat request (HARQ) feedback is active, and the terminal for receiving the service is allowed to perform a 1-bit HARQ feedback on a same PSFCH resource for one transmission of the current TB by the terminal.

The above-mentioned case 1 of activating the HARQ feedback or activating the blind retransmission is that the terminal for receiving the service feeds back to multiple transmissions of the current TB, and there is no required time interval between two adjacent transmissions.

For case 1 of activating the HARQ feedback or activating the blind retransmission, the terminal determining the retransmission resource for the service from the resource selection window includes determining the retransmission resource for the service with equal probability from candidate resources of the resource selection window.

The retransmission resource is located after a resource selected for a last transmission of the current TB, and the candidate resources are a set of resources which have not been excluded from the resource selection window.

Exemplarily, with reference to FIG. 14, there is a service to be transmitted at time n, and the terminal excludes corresponding time-frequency resources from a selection window from n+T1 to n+T2 based on a listening result of a listening window from time n−T0 to time n. The remained resources in the resource selection window are used as candidate resources, and all the candidate resources form resource set A, including resources {x, y, z, m, n, j, g, h} in FIG. 9. It is assumed that a resource pool is configuration with N=4 (i.e., every four slots are configured with a PSFCH resource), and k=2. The terminal performs one initial transmission and two retransmissions for the current TB.

The terminal firstly selects an initial transmission resource between time n and time n+p, then the terminal randomly selects the initial transmission resource from resource set {x, y} with equal probability, and it is assumed that the terminal selects resource x as the initial transmission resource.

The terminal activates case 1 of a HARQ feedback or activates a blind retransmission, and randomly selects the remained two retransmissions from resource set {y, z, m, n, j, g, h}.

For case 2 of activating a HARQ feedback, the receiving terminal feeds back for one transmission of the current TB, and at least one PSFCH resource must be included between two adjacent transmissions, therefore a PSFCH resource is present between the retransmission resource and a resource selected for a last transmission of the current TB.

In one example, the time when the retransmission resource is located is greater than time n+α+Q, where n+α is the time when the terminal for receiving the service performs a HARQ feedback on a last transmission of the current TB, and Q is a processing time length required by the terminal from receiving the HARQ feedback to sending a next transmission.

Optionally, a PSFCH resource is included in slot n+α, and through the PSFCH resource, the terminal for receiving the service performs a HARQ feedback on the last transmission of the current TB by the terminal, where α is greater than or equal to k, and k takes 2 or 3 slots in NR-V2X.

Exemplarily, with reference to FIG. 14, based on a slot where the selected initial transmission resource x is located and the resource pool configuration, the terminal calculates that in slot n+α, the receiving terminal performs a HARQ feedback on the initial transmission of the terminal.

The terminal selects a resource for a first retransmission between slot n+α+Q (excluding this slot) and time n+T2, i.e., the terminal randomly selects the resource for the first retransmission from resource set {z, m, n, j, g, h}, and it is assumed that the terminal selects resource z. Thereafter, based on a slot where resource z is located and the resource pool configuration, the terminal calculates that in slot n+β, the receiving terminal performs a HARQ feedback on the first retransmission of the terminal. Then, the terminal selects a resource for a second retransmission between slot n+β+Q (excluding this slot) and time n+T2, i.e., the terminal selects a resource for the second retransmission from resource set {j, g, h}, and the terminal finally selects resource h as the resource for the second retransmission. When there is no resource in set A included between slot n+13+Q (excluding this slot) and time n+T$_2$, the terminal gives up the second retransmission.

In one example, the terminal re-evaluates the retransmission resource; and when a conflict occurs in the retransmission resource, the terminal determines a second reselection resource for the retransmission resource from a second reselection window.

The second reselection window is a window from time n+t$_2$+T$_{31}$ to time n+t$_2$+T$_{32}$, the second reselection resource is a time frequency resource in the candidate resources of the second reselection window that has a distance from the retransmission resource less than or equal to a distance i, i being an integer not less than 0, time n+t$_2$ is the time when it is determined that the conflict occurs in the retransmission resource, and the candidate resources are a set of resources in the second reselection window which have not been excluded after exclusion based on a listening result of the resource listening window.

It should be noted that when there is more than one time frequency resource in the candidate resources of the second reselection window that has a distance from the retransmission resource less than or equal to distance i, the terminal selects one time frequency resource from them as the second reselection resource with equal probability.

Optionally, a first time period from time $n+t_2$ to time $n+t_2+T_{31}$ is greater than or equal to a processing delay of the terminal, and a second time period from time n to time $n+t_2+T_{32}$ is less than or equal to a required delay range of the service.

Exemplarily, $t_2$ is 500 ms, and the terminal determines that a conflict occurs in the retransmission resource at n+500 ms; the processing delay of the terminal is 10 ms, and the first time period from time $n+t_2$ to time $n+t_2+T_{31}$ is equal to the processing delay of the terminal, which is also 10 ms; and the required delay range of the service is 1000 ms, the second time period from time n to time $n+t_2+T_{32}$ is equal to the required delay range of the service, and $T_{32}$ is 500 ms. The second reselection window is a window from time $n+t_2+10$ to time $n+t_2+500$.

The conflict occurring in the retransmission resource means that during re-evaluation, the retransmission transmission resource selected by the terminal is also reserved by other terminal as an initial transmission resource or a retransmission resource for transmitting other service.

Optionally, when a conflict occurs in a retransmission resource of terminal UE1, terminal UE1 measures a RSRP of other terminal UE2 in conflict, and only when the measured RSRP of UE2 is higher than a RSRP threshold of UE1 and the priority of UE2 is higher than its own priority (the priority carried in a PSCCH of UE2 is higher than the priority of service data to be transmitted by terminal UE1), terminal UE1 reselects a resource to determine a second reselection resource. The above-mentioned RSRP threshold is determined by the priority carried in a PSCCH heard by terminal UE1 and the priority of service data to be transmitted.

After determining that the conflict occurs in the retransmission resource, the terminal releases the retransmission resource, determines a window from time $n+t_2+T_{31}$ to time $n+t_2+T_{32}$ as a second reselection window, and excludes resources from the second reselection window based on a listening result of a second resource listening window to obtain candidate resources, where the process of exclusion is described as above. The second resource listening window is a window from time $n+t_2-T_0$ to time $n+t_2$.

Referring to FIG. 15, the determining the second reselection resource for the retransmission resource from the second reselection window may include the following steps.

In step 1501, a second slot interval $s_2-i$ to $s_2+i$ is determined, where $s_2$ is a slot corresponding to the retransmission resource, and a starting value of i is $R_2$, $R_2$ being an integer not less than 0.

In step 1502, when candidate resources located in the second slot interval are present in the second reselection window, the second reselection resource is determined with equal probability from the candidate resources located in the second slot interval.

In step 1503, when no candidate resource located in the second slot interval is present in the second reselection window, the step of determining the second slot interval from $s_2-i$ to $s_2+i$ is performed again after i is added by one.

Optionally, the second reselection resource and a resource which has been selected are located at different time, and the resource which has been selected is a resource selected by the terminal for other transmission of the current TB.

If resource m is a retransmission resource selected by the terminal for another retransmission of the current TB, then the terminal does not take resource m as the second reselection resource when performing reselection on the retransmission resource.

Figure 16:
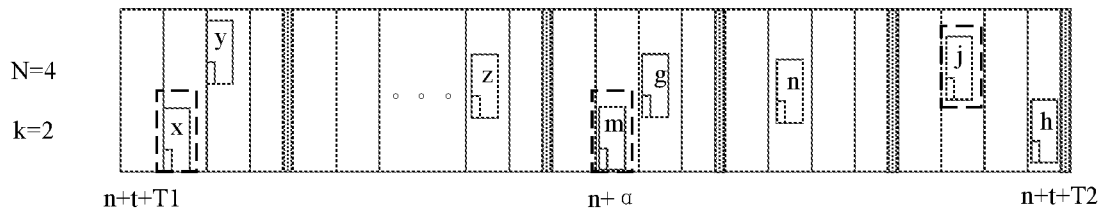
FIG. 16 is a schematic diagram of resource selection in a vehicle to everything system provided by an exemplary embodiment of the present application.

Exemplarily, with reference to FIG. 16, there is a service to be transmitted at time n by the terminal. The terminal completes resource selection and selects resource x, resource m and resource j in FIG. 16 as the transmission resources (including initial transmission and retransmission).

At time n+t, the terminal learns that resource m conflicts with a resource reserved by other terminal through re-evaluation, and the terminal needs to perform resource reselection for resource m. The terminal excludes a corresponding time frequency resource from a resource selection window from n+t+T1 to n+t+T2 based on a listening result of a resource listening window from time n+t−T0 to time n+t.

In addition, the terminal excludes all resources in the slot in which resource x and resource j are located. The remained resources in the resource selection window are used as candidate resources, and all candidate resources form resource set A, including resources {y, z, g, n, h} in FIG. 16. It is assuming that the resource pool configuration is N=4, and k=2. The terminal performs one initial transmission and two retransmissions for the current TB. The terminal needs Q slots to perform a next transmission after receiving a HARQ feedback.

Resource m is located in slot n+α, and the terminal performs resource reselection for resource m.

The terminal firstly sets i as 0, i.e., the terminal searches for a resource which belongs to resource set A in slot n+a. If the resource belonging to resource set A is not found in slot n+α, then the terminal adds 1 to i, i.e., the terminal searches for a resource belonging to resource set A in slot n+α−1 and slot n+α+1. The terminal finds resource g and selects resource g as the reselection resources for resource m.

In summary, the terminal for receiving the service may perform a 1-bit HARQ feedback on one PSFCH resource for multiple transmissions of the current service by the terminal, or may perform a 1-bit HARQ feedback on one PSFCH resource for one transmission of the current service by the terminal, therefore the method provided by the present embodiment provides appropriate resource selection solutions which are designed for these two cases respectively.

Meanwhile, in the method provided by the present embodiment, when performing resource reselection for the initial transmission resource in conflict based on re-evaluation, the terminal determines a time-frequency resource, which is located close to the original retransmission resource in time domain, from the remained resources after resource exclusion as a reselection resource, therefore the case that the time domain position of the reselection resource is relatively rearward in the resource selection window is avoided, and the timeliness of service transmission is guaranteed again.

Figure 17:
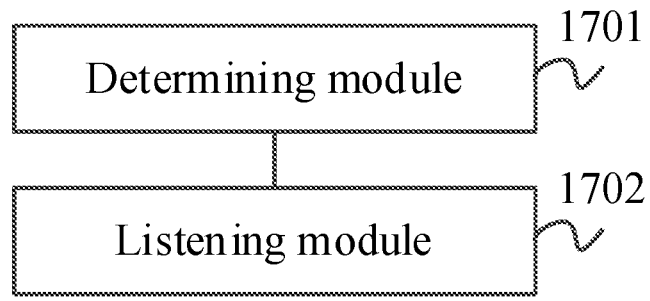
FIG. 17 is a structural block diagram of an apparatus for resource selection in a vehicle to everything system provided by an exemplary embodiment of the present application.

FIG. 17 shows a structural block diagram of an apparatus for resource selection in a V2X system provided by an exemplary embodiment of the present application, and the apparatus includes: a determining module 1701.

The determining module 1701 is configured to, when there is a service to be transmitted at time n, select an initial transmission resource for the service from a resource selection window, the initial transmission resource being located between time n and time n+p.

The resource selection window is a window from time $n+T_{11}$ to time $n+T_{12}$, a first time period from the time n to the time $n+T_{11}$ is greater than or equal to a processing delay of the terminal, a second time period from the time n to the time $n+T_{12}$ is less than or equal to a required delay range of the service, and a value of p is less than a preset value W.

In one example, the determining module 1701 is configured to determine a resource listening window and the resource selection window; the determining module 1701 is configured to exclude resources from the resource selection window based on a listening result of the resource listening window to obtain candidate resources in the resource selection window; and the determining module 1701 is configured to select the initial transmission resource for the service from the candidate resources.

In one example, the apparatus further comprises a listening module 1702; the listening module 1702 is configured to re-evaluate the initial transmission resource; the determining module 1701 is configured to, when a conflict occurs in the initial transmission resource, determine a first reselection resource for the initial transmission resource from a first reselection window; and where the first reselection window is a window from time $n+t_1+T_{21}$ to time $n+t_1+T_{21}$, the first reselection resource is a time frequency resource in the candidate resources of the first reselection window that has a distance from the initial transmission resource less than or equal to a distance i, i being an integer not less than 0, the time $n+t_1$ is the time when it is determined that the conflict occurs in the initial transmission resource, and the candidate resources are a set of resources in the first reselection window which have not been excluded after exclusion based on a listening result of the resource listening window.

In one example, the determining module 1701 is configured to determine a first slot interval $s_1-i$ to $s_1+i$, where $s_1$ is a slot corresponding to the initial transmission resource, and a starting value of i is $R_1$, $R_1$ being an integer not less than 0; the determining module 1701 is configured to, when a candidate resource located in the first slot interval is present in the first reselection window, determine the first reselection resource with equal probability from the candidate resource located in the first slot interval; and the determining module 1701 is configured to, when no candidate resource located in the first slot interval is present in the first reselection window, perform the step of determining the first slot interval $s_1-i$ to $s_1+i$ again after i is added by one.

In one example, the first reselection resource and a resource which has been selected are located at different time, and the resource which has been selected is a resource selected by the terminal for other transmission of a current TB.

In one example, the determining module 1701 is configured to select a retransmission resource for the service from the resource selection window, where the retransmission resource is located after the initial transmission resource.

In one example, the determining module 1701 is configured to, when a hybrid automatic repeat request (HARQ) feedback is active, and a terminal for receiving the service is allowed to perform a 1-bit HARQ feedback on a same PSFCH resource for at least two transmissions of the current TB by the terminal, determine the retransmission resource for the service from the resource selection window.

In one example, the determining module 1701 is configured to, when a blind retransmission is active, determine the retransmission resource for the service from the resource selection window.

In one example, the determining module 1701 is configured to determine the retransmission resource for the service with equal probability, from the candidate resources of the resource selection window; where the retransmission resource is located after a resource selected for a last transmission of the current TB, and the candidate resources are a set of resources in the first reselection window which have not been excluded.

In one example, the determining module 1701 is configured to, when a hybrid automatic repeat request (HARQ) feedback is active, and a terminal for receiving the service is allowed to perform a 1-bit HARQ feedback on one PSFCH resource for one transmission of the current TB by the terminal, determine the retransmission resource for the service from the resource selection window; and where the PSFCH resource is present between the retransmission resource and a resource selected for a last transmission of the current TB.

In one example, the time when the retransmission resource is located is greater than time $n+\alpha+Q$, where $n+\alpha$ is the time when the terminal for receiving the service performs a HARQ feedback on the last transmission of the current TB by the terminal, and Q is a processing time length that is required by the terminal from receiving the HARQ feedback to sending a next transmission.

In one example, a listening module 1702 is configured to re-evaluate the retransmission resource; the determining module 1701 is configured to, when a conflict occurs in the retransmission resource, determine a second reselection resource for the retransmission resource from a second reselection window; and where the second reselection window is a window from time $n+t_2+T_{31}$ to time $n+t_2+T_{32}$, the second reselection resource is a time frequency resource in candidate resources of the second reselection window that has a distance from the retransmission resource less than or equal to a distance i, i being an integer not less than 0, the time $n+t_2$ is the time when it is determined that the conflict occurs in the retransmission resource, and the candidate resources are a set of resources in the second reselection window which have not been excluded after exclusion based on a listening result of the resource listening window.

In one example, the determining module 1701 is configured to determine a second slot interval from $s_2-i$ to $s_2+i$, where $s_2$ is a slot corresponding to the retransmission resource, and a starting value of i is $R_2$, $R_2$ being an integer not less than 0; the determining module 1701 is configured to, when the candidate resource located in the second slot interval is present in the second reselection window, determine the second reselection resource with equal probability from the candidate resource located in the second slot interval; and the determining module 1701 is configured to, when no candidate resource located in the second slot interval is present in the second reselection window, perform the step of determining the second slot interval from $s_2-i$ to $s_2+i$ again after i is added by one.

In one example, the second reselection resource and a resource which has been selected are located at different time, and the resource which has been selected is a resource selected by the terminal for other transmission of the current TB.

Figure 18:
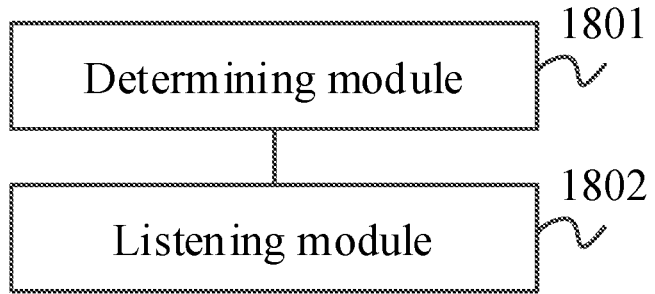
FIG. 18 is a structural block diagram of an apparatus for resource selection in a vehicle to everything system provided by an exemplary embodiment of the present application.

FIG. 18 is a structural block diagram of an apparatus for resource selection in a V2X system provided by an exemplary embodiment of the present application, and the apparatus includes: a determining module 1801.

The determining module 1801 is configured to, when there is a service to be transmitted at the time n, select a retransmission resource for the service from a resource selection window, the retransmission resource being located after an initial resource.

The resource selection window is a window from time $n+T_{11}$ to time $n+T_{12}$, a first time period from the time n to the time $T_{11}$ is greater than or equal to a processing delay of the terminal, a second time period from the time n to the time $n+T_{12}$ is less than or equal to a required delay range of the service.

In one example, the determining module 1801 is configured to, when a hybrid automatic repeat request (HARQ) feedback is active, and a terminal for receiving the service is allowed to perform a 1-bit HARQ feedback on a same PSFCH resource for at least two transmissions of the current TB by the terminal, determine the retransmission resource for the service from the resource selection window.

In one example, the determining module 1801 is configured to, when a blind retransmission is active, determine the retransmission resource for the service from the resource selection window.

In one example, the determining module 1801 is configured to determine the retransmission resource for the service with equal probability from the candidate resources of the resource selection window; where the retransmission resource is located after a resource selected for a last transmission of the current TB, and the candidate resources are a set of resources which have not been excluded from the resource selection window.

In one example, the determining module 1801 is configured to, when a hybrid automatic repeat request (HARQ) feedback is active, and a terminal for receiving the service is allowed to perform a 1-bit HARQ feedback on one PSFCH resource for one transmission of the current TB by the terminal, determine the retransmission resource for the service from the resource selection window; where the PSFCH resource is present between the retransmission resource and a resource selected for a last transmission of the current TB.

In one example, the time when the retransmission resource is located is greater than time $n+\alpha+Q$, where $n+\alpha$ is the time when the terminal for receiving the service performs a HARQ feedback for a last transmission of the current TB by the terminal, and Q is a processing time length required by the terminal from receiving the HARQ feedback to sending a next transmission.

In one example, the apparatus further includes: a listening module 1802; the listening module 1802 is configured to re-evaluate the retransmission resource continuously; the determining module is configured to, when a conflict occurs in the retransmission resource, determine a second reselection resource for the retransmission resource from a second reselection window; and where the second reselection window is a window from time $n+t_2+T_{31}$ to time $n+t_2+T_{32}$, the second reselection resource is a time frequency resource in candidate resources of the second reselection window that has a distance from the retransmission resource less than or equal to a distance i, i being an integer not less than 0, the time $n+t_2$ is the time when it is determined that the conflict occurs in the retransmission resource, and the candidate resources are a set of resources in the second reselection window which have not been excluded after exclusion based on a listening result of the resource listening window.

In one example, the determining module 1801 is configured to determine a second slot interval from $s_2-i$ to $s_2+i$, where $s_2$ is a slot corresponding to the retransmission resource, and a starting value of i is $R_2$, $R_2$ being an integer not less than 0; the determining module 1801 is configured to, when a candidate resource located in the second slot interval is present in the second reselection window, determine the second reselection resource with equal probability from the candidate resource located in the second slot interval; and the determining module 1801 is configured to, when no candidate resource located in the second slot interval is present in the second reselection window, perform the step of determining the second slot interval from $s_2-i$ to $s_2+i$ again after i is added by one.

In one example, the second reselection resource and a resource which has been selected are at different time, and the resource which has been selected is a resource selected by the terminal for other transmission of the current TB.

Figure 19:
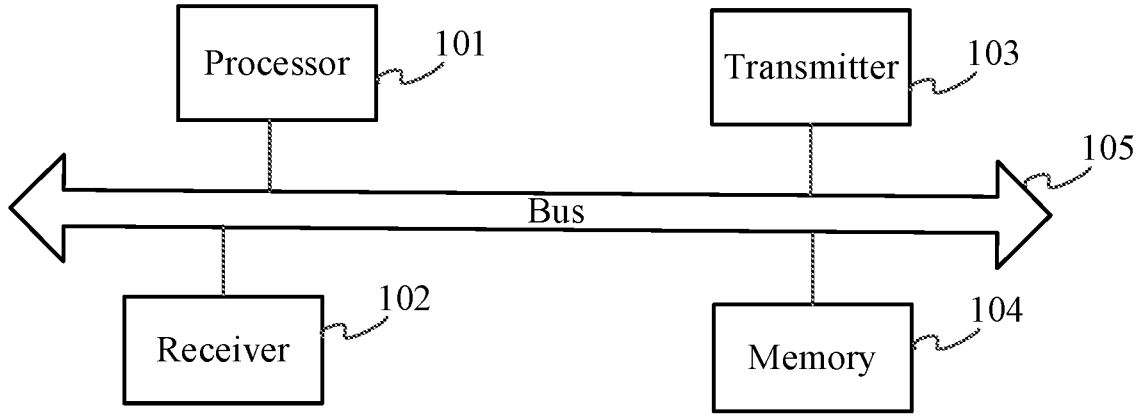
FIG. 19 is a structural diagram of a terminal provided by an exemplary embodiment of the present application.

FIG. 19 shows a structural diagram of a sending terminal provided by an exemplary embodiment of the present application, and the communication device includes a processor 101, a receiver 102, a transmitter 103, a memory 104 and a bus 105.

The processor 101 includes one or more processing cores, and executes various functional applications and information processing by running software programs and modules.

The receiver 102 and the transmitter 103 may be implemented as one communication component, which may be a piece of communication chip.

The memory 104 is connected to the processor 101 via a bus 105.

The memory 104 may be configured to store at least one instruction, and the processor 101 is configured to execute the at least one instruction to implement individual steps in the above-mentioned method embodiments.

In addition, the memory 104 may be implemented by any type of volatile or nonvolatile storage devices or a combination thereof, including but not limited to magnetic disk or optical disc, erasable programmable read only memory (EEPROM), erasable programmable read only memory (EPROM), static random access memory (SRAM), read-only memory (ROM), magnetic memory, flash memory, and programmable read-only memory (PROM).

In an exemplary embodiment, there is also provided a computer-readable storage medium in which at least one instruction, at least one program, a code set or an instruction set is stored, where the at least one instruction, the at least one program, the code set or the instruction set is loaded and executed by the processor to implement the method for resource selection in a V2X system executed by the sending terminal, provided by the above-mentioned method embodiments.

Those of ordinary skill in the art can understand that all or part of the steps to implement the above-mentioned embodiments may be completed by hardware or by instructing a relevant hardware through a program, where the program may be stored in a computer-readable storage medium, and the storage medium above-mentioned may be a read-only memory, a magnetic disk or an optical disc.

The above-mentioned are only optional embodiments of the present application, and are not intended to limit the present application. All the modifications, equivalent replacements, improvements, etc. made within the spirit and principle of the present application should be included in the protection scope of the present application.

What is claimed is:

1. A method for resource selection in a sidelink communication, wherein the method comprises:
  when there is a service to be transmitted at time n, selecting a retransmission resource for the service from a resource selection window, the retransmission resource being located after an initial transmission resource for the service;
  wherein the resource selection window is a window from time $n+T_{11}$ to time $n+T_{12}$, a first time period from the time n to the time $n+T_{11}$ is greater than or equal to a processing delay of a terminal, and a second time period from the time n to the time n+$T_{12}$ is less than or equal to a required delay range of the service,
wherein the selecting the retransmission resource for the service from the resource selection window comprises:
when a hybrid automatic repeat request (HARQ) feedback is in an active state, and a terminal for receiving the service is allowed to perform an HARQ feedback on one PSFCH resource for one transmission of a current TB by the terminal, determining the retransmission resource for the service from the resource selection window;
wherein the PSFCH resource is present between the retransmission resource and a resource selected for a last transmission of the current TB.

2. The method according to claim 1, wherein the selecting the retransmission resource for the service from the resource selection window comprises:
when the HARQ feedback is in the active state, and the terminal for receiving the service is allowed to perform a 1-bit HARQ feedback on a same PSFCH resource for at least two transmissions of the current TB by the terminal, determining the retransmission resource for the service from the resource selection window.

3. The method according to claim 1, wherein the selecting the retransmission resource for the service from the resource selection window comprises:
when a blind retransmission is in an active state, determining the retransmission resource for the service from the resource selection window.

4. The method according to claim 1, wherein the determining the retransmission resource for the service from the resource selection window comprises:
determining the retransmission resource for the service with equal probability from candidate resources in the resource selection window;
wherein the retransmission resource is located after the resource selected for the last transmission of the current TB, and the candidate resources are a set of resources in the resource selection window that have not been excluded after exclusion based on a listening result of a resource listening window.

5. The method according to claim 1, wherein time where the retransmission resource is located is greater than time n+α+Q,
wherein n+α is a moment when the terminal for receiving the service performs the HARQ feedback for the last transmission of the current TB by the terminal, and Q is a processing time length that is required by the terminal from receiving the HARQ feedback to sending a next transmission.

6. The method according to claim 1, wherein the selecting the retransmission resource for the service from the resource selection window comprises:
when the HARQ feedback is in the active state, and the terminal for receiving the service is allowed to perform a 1-bit HARQ feedback on one PSFCH resource for one transmission of the current TB by the terminal, determining the retransmission resource for the service from the resource selection window.

7. An apparatus for resource selection in a sidelink communication, wherein the apparatus comprises:
a processor;
a transceiver connected to the processor; and
a memory configured to store executable instructions of the processor;
wherein the processor is configured to load and execute the executable instructions to:

when there is a service to be transmitted at time n, select a retransmission resource for the service from a resource selection window, the retransmission resource being located after an initial transmission resource for the service; and
wherein the resource selection window is a window from time n+$T_{11}$ to time n+$T_{12}$, a first time period from the time n to the time n+$T_{11}$ is greater than or equal to a processing delay of a terminal, and a second time period from the time n to the time n+$T_{12}$ is less than or equal to a required delay range of the service,
wherein the processor is further configured to, when a hybrid automatic repeat request (HARQ) feedback is in an active state, and a terminal for receiving the service is allowed to perform an HARQ feedback on one PSFCH resource for one transmission of a current TB by the terminal, determine the retransmission resource for the service from the resource selection window; and
wherein the PSFCH resource is present between the retransmission resource and a resource selected for a last transmission of the current TB.

8. The apparatus according to claim 7, wherein
the processor is further configured to, when the HARQ feedback is in the active state, and the terminal for receiving the service is allowed to perform a 1-bit HARQ feedback on a same PSFCH resource for at least two transmissions of the current TB by the terminal, determine the retransmission resource for the service from the resource selection window.

9. The apparatus according to claim 7, wherein
the processor is further configured to, when a blind retransmission is in an active state, determine the retransmission resource for the service from the resource selection window.

10. The apparatus according to claim 8, wherein
the processor is further configured to determine the retransmission resource for the service with equal probability from candidate resources in the resource selection window; and
wherein the retransmission resource is located after the resource selected for the last transmission of the current TB, and the candidate resources are a set of resources in the resource selection window that have not been excluded after exclusion based on a listening result of a resource listening window.

11. The apparatus according to claim 7, wherein time where the retransmission resource is located is greater than time n+α+Q,
wherein n+α is a moment when the terminal for receiving the service performs the HARQ feedback for the last transmission of the current TB by the terminal, and Q is a processing time required by the terminal from receiving the HARQ feedback to sending a next transmission.

12. The apparatus according to claim 7, wherein the processor is further configured to:
when the HARQ feedback is in the active state, and the terminal for receiving the service is allowed to perform a 1-bit HARQ feedback on one PSFCH resource for one transmission of the current TB by the terminal, determine the retransmission resource for the service from the resource selection window.

13. A non-transitory computer-readable storage medium, wherein executable instructions are stored in the readable storage medium, and the executable instructions are loaded and executed by a processor to implement:

when there is a service to be transmitted at time n, selecting a retransmission resource for the service from a resource selection window, the retransmission resource being located after an initial transmission resource for the service;

wherein the resource selection window is a window from time $n+T_{11}$ to time $n+T_{12}$, a first time period from the time n to the time $n+T_{11}$ is greater than or equal to a processing delay of a terminal, and a second time period from the time n to the time $n+T_{12}$ is less than or equal to a required delay range of the service, wherein the selecting the retransmission resource for the service from the resource selection window comprises:

when a hybrid automatic repeat request (HARQ) feedback is in an active state, and a terminal for receiving the service is allowed to perform an HARQ feedback on one PSFCH resource for one transmission of a current TB by the terminal, determining the retransmission resource for the service from the resource selection window;

wherein the PSFCH resource is present between the retransmission resource and a resource selected for a last transmission of the current TB.

\* \* \* \* \*